June 7, 1932.  F. PARDEE  1,861,976
COMBINED LOWERING AND WITHDRAWAL CHUTE
Filed July 8, 1931  2 Sheets-Sheet 2
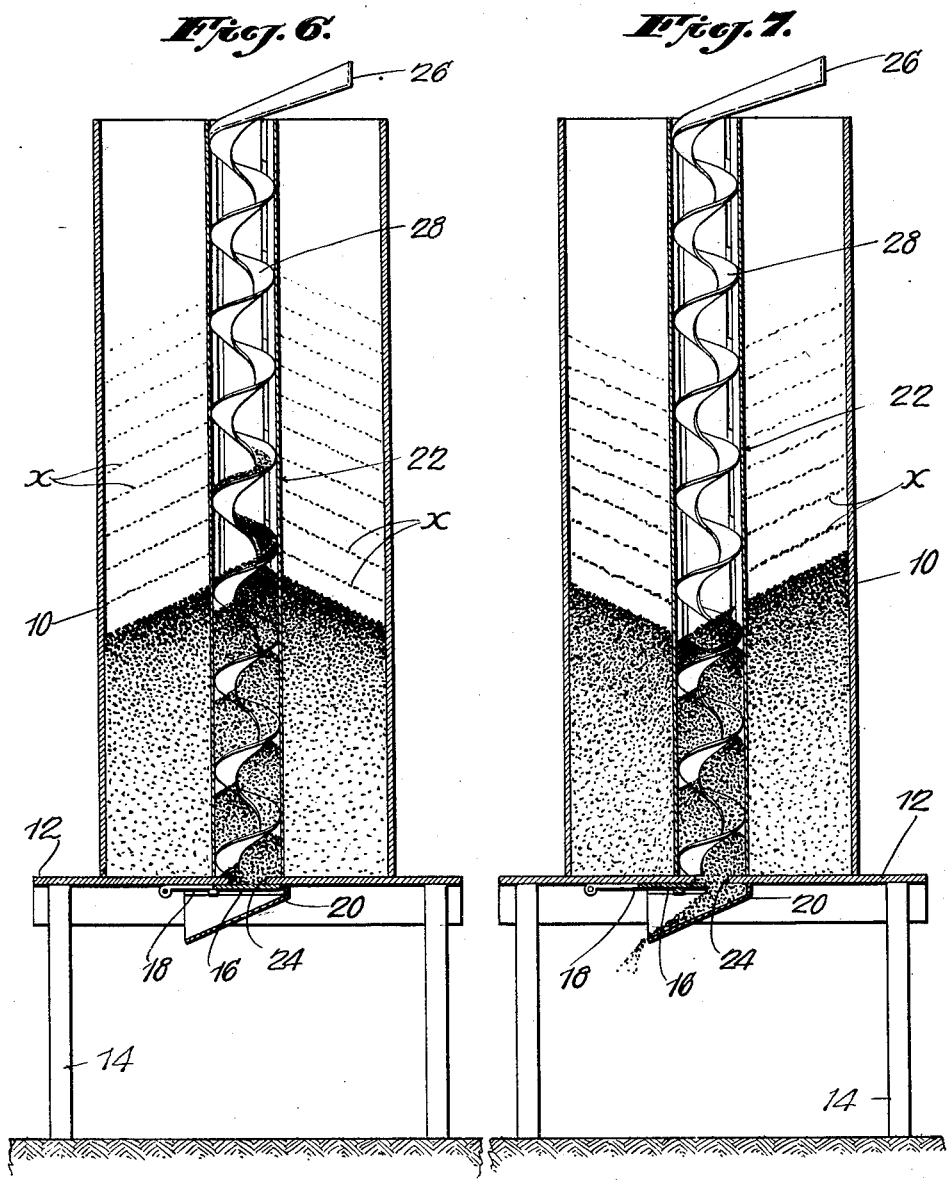
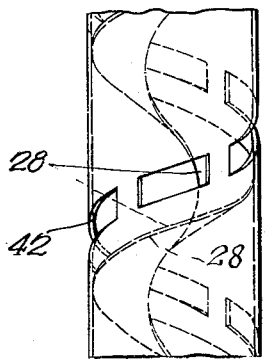
INVENTOR
FRANK PARDEE.
BY
ATTORNEYS Patented June 7, 1932

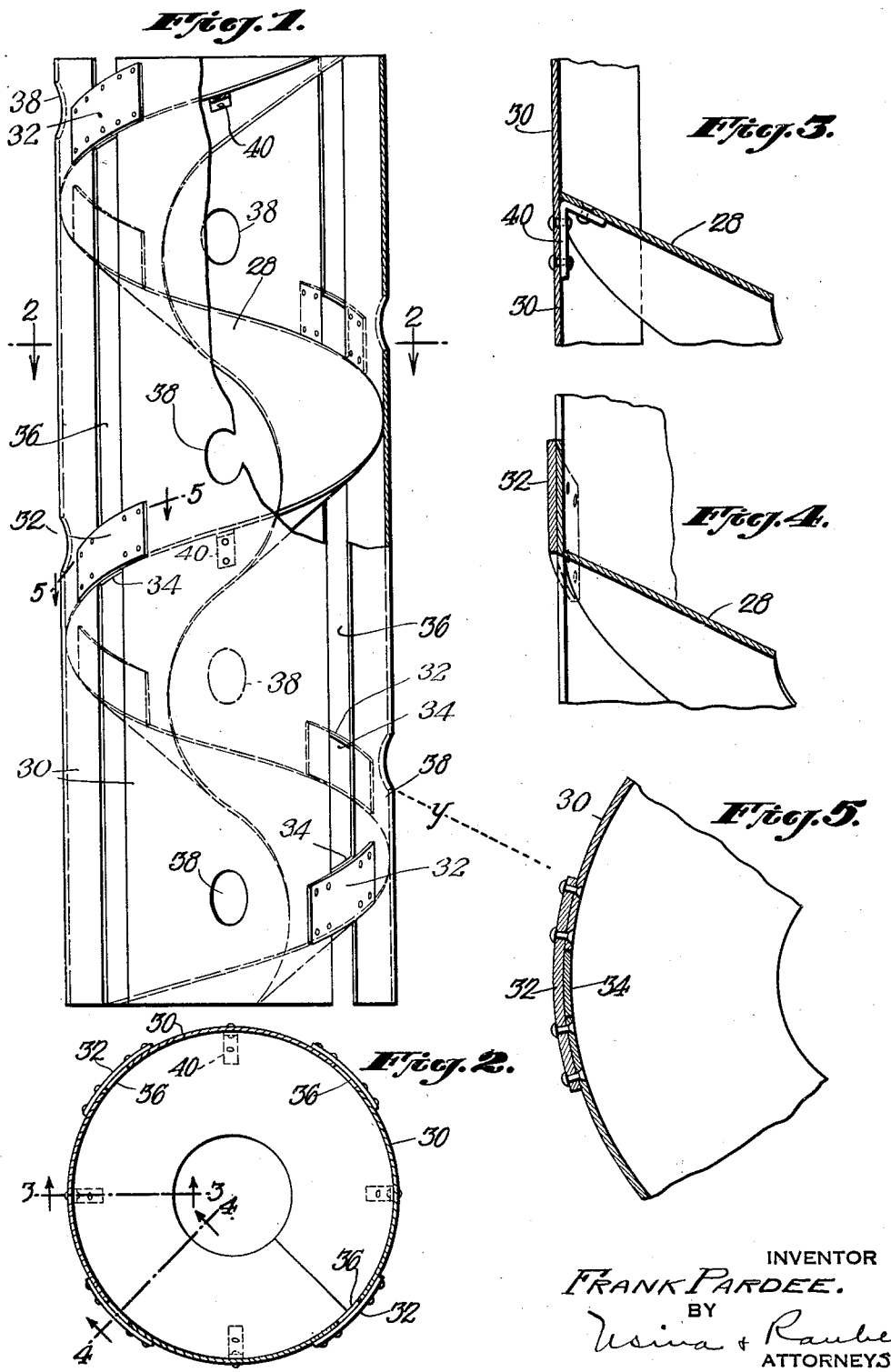

1,861,976

UNITED STATES PATENT OFFICE

FRANK PARDEE, OF HAZLETON, PENNSYLVANIA, ASSIGNOR TO ANTHRACITE SEPARATOR COMPANY, OF HAZLETON, PENNSYLVANIA, A CORPORATION OF PENNSYLVANIA

COMBINED LOWERING AND WITHDRAWAL CHUTE

Application filed July 8, 1931. Serial No. 549,374.

This invention relates to a combined loading and withdrawal chute adapted for handling lump material such as coal or the like. The invention aims to provide a single apparatus which is effective to load coal or similar lump material into a bin or other storage receptacle with a minimum amount of breakage and also serve to withdraw such material from the receptacle in such a way that there will be a minimum amount of relative movement between the lumps constituting the total mass in the receptacle.

The invention will be more fully apparent from the following specification when read in connection with the accompanying drawings and will be defined with particularity in the appended claims.

In the drawings:—

Fig. 1 is an elevation showing a short length of a combined loading and withdrawal chute embodying the invention;

Fig. 2 is a horizontal section on line 2—2 of Fig. 1;

Fig. 3 is a vertical section on line 3—3 of Fig. 2;

Fig. 4 is a vertical section on line 4—4 of Fig. 2;

Fig. 5 is a horizontal section on line 5—5 of Fig. 1;

Figs. 6 and 7 are vertical sections through a storage bin equipped with a combined loading and withdrawal chute and illustrating respectively the loading and discharging operation;

Fig. 8 is a fragmentary elevation illustrating a modification.

Referring in detail to the drawings, 10 represents a storage bin secured to a structure 12 carried by supporting columns 14 (Fig. 6). The receptacle is provided with a suitable discharge gate 16 slidable in guides 18 and controlling the flow of coal or similar lump material from the receptacle 10 to an outlet discharge chute 20.

My improved combined loading and withdrawal chute, indicated as a whole at 22, is disposed vertically within the storage receptacle, the lower extremity of the device being adapted to discharge material through an opening 24 normally closed by the gate 16.

The material to be stored in the bin or receptacle 10 is fed from above through a trough 26 to the upper end of the combined withdrawal and discharge chute. This combined device includes a spiral runway 28 preferably formed of segmental plates. This runway, as indicated in the sections of Figs. 3 and 4 is so arranged that it has an inward and downward inclination or pitch.

The runway is substantially or approximately enclosed by a plurality of arcuate segmental plates 30. These plates form retaining walls and they are united by connecting plates 32, the latter having spacing members 34 secured thereto which are the same thickness as the segmental plates 30, as indicated in Fig. 5. The members 34 are of such width and the plates 30 are of such size that longitudinally extending passages, indicated at 36 are formed. These passages are adapted to permit the flow of material to and from the runway as will more fully hereinafter appear. At spaced intervals, the plates are also provided in some cases with openings 38 forming auxiliary passages for the flow of material to or from the runway.

The plates 30 in effect form spaced retaining walls defining restricted passages 36 for the flow of material to and from the runway. These plates also serve the important function of supporting on the spiral runway, suitable brackets 40 being riveted or otherwise secured thereto at spaced intervals. These brackets are in turn fastened to the underside of the runway, as clearly shown in Fig. 3.

In operation of loading or filling up the receptacle, the material is fed through the trough 26 to the upper end of the runway 28. The downward and inward inclination of the spiral runway is such that the material travels in a sinuous path along the runway until it reaches the bottom or floor of the receptacle. The pile then begins to accumulate within the plates 30, some of the material gradually finding its way out through the restricted passages 36. The pile gradually or progressively mounts higher and higher, as indicated by the successive dotted contour lines x—x in Fig. 6. Some of the material passes through the openings 38 as the material mounts higher and higher.

The object of providing the holes 38 is to minimize the amount of drop of the lumps of coal falling from the interior of the retaining plates 30 to the pile accumulating around the exterior thereof. It will be understood that the coal or other lump material travelling on the runway is obliged to climb over the spacer plates 34 before it can flow or fall on top of the previously accumulated mass of coal exterior of the retaining plates 30. It will be understood that in loading the bin the top of the pile within the plates 30 is usually higher than the mass of coal exterior of the plates. The purpose of providing the holes or openings 38 is to cut down the distance which the coal will have to drop from the interior pile to the exterior pile. To illustrate, if the top of the pile is assumed to be at the point indicated by the dotted line y of Fig. 1 on the exterior of the retaining plate 30 without the openings 38 it will be understood that the next opportunity which the coal would have to escape from the interior would be when it reached the next spacer plate one quarter turn higher up along the spiral runway. Thus a given lump would have to drop a distance approximately equal to the vertical distance represented by the amount of rise on one quarter turn of the spiral runway. By providing an opening, such as indicated at 38 midway between these points the lumps can escape from the interior of the retaining plates earlier in the rise thus the drop would be approximately half the distance. This is advantageous as it minimizes breakage.

The construction of Fig. 1 for most practical purposes is quite satisfactory. But, in order to minimize the amount of drop from the interior of the retaining plates 30 to the part of the pile on the exterior thereof, I may provide a substantially spiral outlet passage, as indicated at 42, in Fig. 8. This restricted passage will follow the same general contour or pitch of the runway 28. With this arrangement, as the material mounts up on the interior runway it will spill over and flow through the spiral passage 42, at a substantially or approximately uniform rate as the pile builds up within the receptacle.

The withdrawal action of the apparatus is indicated in Fig. 7. As here shown when the gate 16 is opened at the bottom of the chute the material will flow from the space between the retaining walls or plates 30 and there will be a minimum amount of movement of the entire mass within the bin. This cuts down the grinding action of the several lumps upon one another and minimizes the production of fines. Much of the material is withdrawn progressively from the top of the pile, the lumps rolling gradually down on the top surface of the pile and through the restricted passages 36 onto the metallic spiral runway. In this way, the mass of material is gently lowered and the moving part of the mass is confined almost wholly between the spaced retaining plates 30. These plates relieve the moving inner stream of material of the pressure due to the weight of the mass of coal within the bin surrounding said plates.

When the gate 16 is opened, it will be understood that the support for the mass of coal which is more or less confined within the retaining plates will be removed. Thus gravity will have a tendency to cause the mass confined within the plates to move downward along the spiral runway. And this confined mass is permitted to move relatively to the pile of material in the bin surrounding the plates 30 because of the relief of pressure afforded by said plates 30. As the top of the inner column descends it will be understood that lumps of coal from the outer mass can roll downwardly and inwardly through the restricted passages between the plates and on to the spiral runway. This runway being formed of metal presents a minimum amount of friction and thus permits the coal to be lowered gently at a substantially uniform slow rate. Thus the lumps do not gather any appreciable velocity in traversing the great height of the storage bin. It is evident, therefore, that the material will flow gently and continuously from the opening in the bottom of the bin and on to the discharge chute 20 and thence into a suitable conveyance, such as a coal car, truck or barge.

In practice, I have found it advantageous to so construct the apparatus that each restricted passage 36 or space between the retaining walls is of a width approximately three and one third times as wide as the size of the largest lump of coal handled. For example, when the apparatus is used for handling lumps of stove coal measuring approximately two and three eighths by one and one half inches the transverse width of the restricted passages 36 would be approximately seven and nine tenths inches although it is to be understood that I am not limited to any particular size or proportion of the parts.

While I have described quite precisely certain specific details of the embodiments of the invention herein illustrated it is not to be construed that I am limited thereto since various modifications may be made by those skilled in the art without departing from the invention as defined in the appended claims.

What I claim is:—

1. A combined loading and withdrawal chute comprising an upright spiral-like runway, and a plurality of plate-like enclosure members coextensive with and secured to the runway in spaced relationship to form restricted longitudinally extending passages for the flow of material to and from the runway.

2. A combined loading and withdrawal chute comprising a vertically disposed spiral runway secured to a plurality of upright arcuate plates spaced to provide upright longitudinally extending passages for the flow of material to and from the runway.

3. In combination with a storage receptacle a single flow control means therein effective to progressively load material in and progressively discharge it from the receptacle, comprising a spiral runway disposed vertically within said receptacle and a plurality of spaced arcuate plates secured to the runway and defining longitudinally extending passages for the flow of material to and from said runway.

4. A device of the character described comprising an upright spiral runway, a casing substantially or approximately enclosing the latter, said casing being provided with a restricted passage extending substantially the full length of the runway.

5. A device of the character described comprising a vertically disposed spiral runway, a plurality of arcuate enclosure plates, connecting members securing the plates to one another with spaces between them.

6. A device of the character described comprising a vertically disposed spiral runway, a plurality of arcuate enclosure plates, connecting members securing the plates to one another with spaces between them, said connecting members having spacing members secured thereto which abut the adjacent edges of said plates.

7. A device of the character described comprising an upright spiral runway, a plurality of enclosing plates conforming in plan to the peripheral shape of the runway, means for joining the plates in spaced relationship, and means for supporting the runway secured to said plates.

8. A device of the character described comprising an upright runway, a plurality of supporting plates substantially or approximately enclosing the runway adapted for conveying coal and like lump material, adjacent plates being spaced and secured to the runway so as to leave a restricted passage between them substantially or approximately three times the width of the largest lumps of coal or other material adapted to be handled on the runway.

9. A device of the character described comprising an upright spiral runway adapted for lowering lump material such as coal or the like, a plurality of upright plates, means holding said plates in assembled relationship with restricted passages between them for the passage of the lump material handled by the runway, said plates being provided with auxiliary apertures for the passage of material.

In witness whereof, I have hereunto signed my name.

FRANK PARDEE.